United States Patent
Fischer

(10) Patent No.: US 6,799,881 B2
(45) Date of Patent: Oct. 5, 2004

(54) EXTRUDER ARRANGEMENT

(75) Inventor: Florian Fischer, Ebersberg (DE)

(73) Assignee: Firma A-Z Formen- und Maschinenbau GmbH (DE)

( * ) Notice: Subject to any disclaimer, the term of this patent is extended or adjusted under 35 U.S.C. 154(b) by 32 days.

(21) Appl. No.: 10/260,002

(22) Filed: Nov. 7, 2002

(65) Prior Publication Data

US 2003/0157210 A1 Aug. 21, 2003

(30) Foreign Application Priority Data

Nov. 8, 2001 (DE) .......................... 101 54 860

(51) Int. Cl.[7] .............................................. B29C 47/24
(52) U.S. Cl. ........................ 366/80; 366/81; 425/135; 425/380; 425/382.3
(58) Field of Search .............................. 366/80, 81, 82, 366/83; 425/135, 380, 382.3

(56) References Cited

U.S. PATENT DOCUMENTS 2,785,438 A * 3/1957 Willert .......................... 366/81
3,771,774 A * 11/1973 Hook ............................ 366/81
6,276,219 B1 8/2001 Kube et al.

FOREIGN PATENT DOCUMENTS

EP 1 080 863 3/2001

* cited by examiner

Primary Examiner—Tony G. Soohoo
(74) Attorney, Agent, or Firm—R W Becker & Associates; R W Becker

(57) ABSTRACT

An extruder arrangement for viscous material, especially rubber or natural or synthetic rubber mixtures, is provided. It has a screw extruder (12) with an extruder screw (16) that in the direction of conveying is followed downstream by a conveying device. The conveying device is a planetary pump (18), the outer ring (22) of which is rotatably supported.

11 Claims, 1 Drawing Sheet

EXTRUDER ARRANGEMENT

BACKGROUND OF THE INVENTION

The invention relates to an extruder arrangement 1 for viscous material, especially rubber or synthetic rubber mixtures, and includes a screw extruder having an extruder screw which is followed, on the downstream side when viewed in the direction of conveyance, by a conveying device.

Such an extruder arrangement is known from EP-A1-508 079. With this approach, an extruder is combined with a geared pump. Geared pumps are more resistant to pressure than are screw extruders. In addition, the output of a gear pump is considerably better, so that the material that is to be conveyed can have a lower temperature. Furthermore, the vibrations of the geared pump that are introduced through the screw walls into the material that is to be extruded are dampened.

However, a geared pump has the drawback that leakage streams result to a certain extent that require a separate sealing. A geared pump must be manufactured very precisely, which makes the manufacture more expensive.

It has furthermore already been proposed to construct a pump in the manner of a planetary gearing. For the sake of simplicity, such a pump will here be signified as a planetary pump. With this approach, the sun or central gear can be connected directly with the extruder screw of the screw extruder, so that there is no need for a separate mounting of the end of the screw. Rather, the support of the end of the screw can be provided on the downstream side of the planetary pump.

A drawback of this approach is that the conveying properties of elastomeric materials such as rubber or rubber mixtures for the tire industry are greatly dependent upon differing parameters. If due to the prevailing viscosity of the material the planetary pump must be advanced to a greater extent than the extruder screw, an underpressure or partial pressure results in the transition zone. This can lead to the formation of bubbles, so that the quality of the conveyed material is not acceptable.

In order to be able to preclude this with certainty, it would be possible to increase the conveying rate of the extruder screw. However, there then results an overpressure in the transition zone, which stresses the construction and impairs the efficiency or output rate.

It is therefore an object of the present invention to provide an extruder arrangement of the aforementioned general type that provides an improved quality of the material that is to be extruded, whereby none-the-less an economical manufacture should be necessary.

SUMMARY OF THE INVENTION

This object is inventively realized by an extruder arrangement where the conveying device is in the form of a planetary pump, and wherein the planetary pump is provided with a rotatably mounted outer ring. Advantageous further developments can be found in the dependent claims.

The inventive approach permits, with surprisingly straightforward means, to keep the quality of the extruded material continuously uniform, even if different materials, for example on the one hand synthetic rubber mixtures and on the other hand mixtures of natural rubber, are utilized. A screw extruder conveys on the basis of the internal friction, and produces a drag flow along the extruder screw. In contrast, a planetary pump is a volumetric conveyor, so that here the conveying rate is considerably less dependent upon the viscosity of the material that is to be conveyed. Thus, the inventive approach also makes it possible to convey in a manner that is relatively independent of viscosity, whereby none-the-less a good efficiency can be achieved with the inventive planetary pump.

Due to the rotatable mounting of the outer ring of the planetary pump, the conveying rate of the planetary pump can to a large extent be set.

For example, the outer ring can be provided with a brake that is controllable. It is then merely necessary to have a drive motor for the extruder screw that can then also at the same time drive the central gear or the planetary carrier of the planetary pump. The setting or adjustment is effected such that even with the greatest viscosity of the material that is to be conveyed, the conveying rate of the planetary pump is still sufficient to prevent an overpressure on the input side of the planetary pump. In this state the brake is then activated, so that the outer ring does not, or nearly does not, rotate along.

If the viscosity is lower, the conveying rate through the extruder screw is also reduced, so that with the outer ring stationary, the planetary pump would have too high of a conveying rate and an underpressure would result in the transition zone. Pursuant to the present invention it is then possible for the outer ring to rotate somewhat. In so doing, the conveying rate of the planetary pump is reduced, so that again the same conveying rates exist between planetary pump and extruder screw.

The setting of the brake can either be prescribed on the basis of empirical values as a function of the viscosity of the material that is to be conveyed, or there is effected an automatic adaptation that is then based, for example, upon a pressure measurement in the transition zone between extruder screw and planetary pump.

With this embodiment, a control device is activated by the pressure sensor that is provided there, and in turn sets the force of the brake.

In a modified embodiment, it is also possible, instead of the brake, to use a separate drive motor that permits an even more sensitive adjustment.

The inventive approach makes it possible to realize a load-symmetrical conveyance. The helical gearing of the planetary pump, in other words also of the planetary pinions, permits a volumetric conveyance. The helical gearing can have any suitable angle, for example an angle of 10 to 60 degrees, preferably somewhat greater than 20 degrees.

The planetary pump is self-cleaning, and can support the end of the screw. Due to the realization at the end of the screw, an economical manufacture is possible, and the occurrence of leakage streams through gears or pinions toward the outside, as with a gear pump, is not possible. As a consequence of the planetary pump, a good output can be realized, and there results a volumetric conveyance that is independent of the material to be conveyed. On the other hand, the inventive approach ensures that the planetary pump will always be supplied with material, so that it will also always convey.

Further advantages, details and features can be seen from the following description of one exemplary embodiment with the aid of the drawing.

BRIEF DESCRIPTION OF THE DRAWINGS

Shown are.

DESCRIPTION OF PREFERRED EMBODIMENTS

Figure 1:
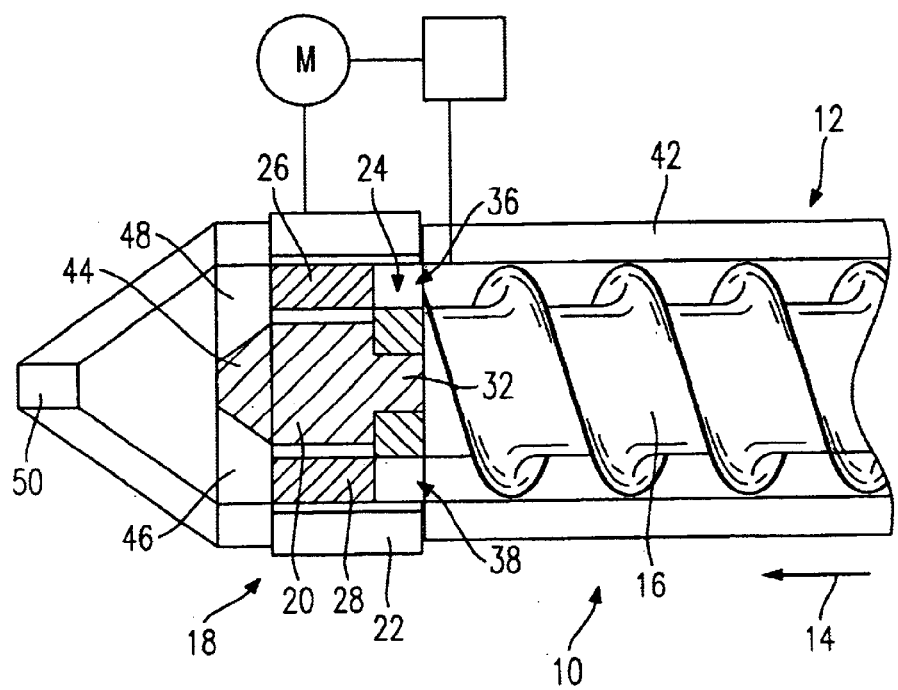
FIG. 1 a schematic view of one inventive embodiment of an extruder arrangement.

The extruder unit 10 illustrated in FIG. 1 is provided with a screw or worm extruder 12 through which, in the direction of the arrow 14, a non-illustrated material that is to be extruded flows. For this purpose, the extruder screw 16 turns in a known manner.

The extruder unit illustrated in FIG. 1 is furthermore provided, following the screw extruder 12, with a planetary pump 18. The planetary pump 18 is comprised of a sun or central gear 20, an outer ring 22, a planetary carrier 24, and a plurality of planetary pinions 26,28 and 30, of which the planetary pinions 26 and 28 can be seen from FIG. 1 and the planetary pinion 30 can also be seen from FIG. 2.

The central gear 20 is inventively fixedly connected with the extruder screw 16, for example via direct mechanical coupling. Its drive shaft 32 is inserted into the extruder screw 16 and passes through the planetary carrier 24.

The planetary carrier 24 supports the planetary pinions 26 to 30 in a known manner such that they rotate upon the central gear 20. Recesses 36,38 and 40 are provided between the locations of the support of the planetary pinions 26 to 30; the material can flow through the recesses.

The planetary pinions 26 to 30 run on the outer ring 22. Pursuant to the present invention the outer ring 22 is rotatably mounted relative to the housing 42 of the screw extruder 12. If the outer ring 22 rotates along in the direction of rotation of the extruder screw and the central gear 20, the conveying rate of the planetary pump 18 is lower. The conveying rate is higher if the outer ring 22 is driven in the opposite direction.

On the downstream side, the central gear 20 is supported on a support means 44 that is supported on the housing 42 via struts 46,48. The central gear 20 is preferably connected with the extruder screw 16 in a manner resistant to bending, so that the support means 44 also supports the extruder screw 16.

In a manner known per se, an extrusion nozzle 50, which is indicated only schematically in FIG. 1, is provided on the output side.

Figure 2:
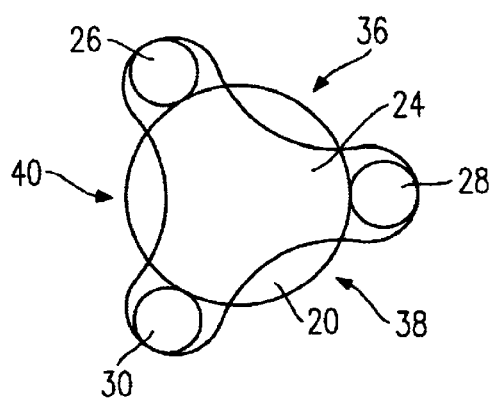
FIG. 2 a schematic view of a planetary carrier for an inventive planetary pump.

From FIG. 2 it can be seen how the planetary carrier 24 supports the planetary pinions 26 to 30. Relatively large recesses 36 to 40 are provided so that the material that is to be extruded need overcome only low resistance to flow.

The specification incorporates by reference the disclosure of German priority document 101 54 860.5 filed on Nov. 8, 2001.

The present invention is, of course, in no way restricted to the specific disclosure of the specification and drawings, but also encompasses any modifications within the scope of the appended claims.

What is claimed is:

1. An extruder arrangement for viscous material, comprising:
   a screw extruder having an extruder screw; and
   a conveying device, in the form of a planetary pump, that is disposed downstream of said extruder screw as viewed in the direction of conveyance of material through said screw extruder, wherein said planetary pump is provided with a rotatably mounted outer ring.

2. An extruder arrangement according to claim 1, wherein said planetary pump is embodied in the manner of a planetary gear train having helical gearing.

3. An extruder arrangement according to claim 2, wherein said helical gearing has an angle of 10 to 60 degrees.

4. An extruder arrangement according to claim 3, wherein said helical gearing has an angle somewhat greater than 20 degrees.

5. An extruder arrangement according to claim 1, wherein said planetary pump is provided with a central gear that is fixedly connected with said extruder screw.

6. An extruder arrangement according to claim 1, wherein said planetary pump is provided with a planetary carrier that is fixedly connected with the extruder screw.

7. An extruder arrangement according to claim 1, wherein said outer ring is coupled with a brake.

8. An extruder arrangement according to claim 7, wherein at least one of the following is applicable: said brake is adjustable and said brake is controllable by a control device.

9. An extruder arrangement according to claim 1, wherein said outer ring is provided with a separate drive, which is controllable.

10. An extruder arrangement according to claim 1, wherein a pressure sensor is provided on an input side of said planetary pump and is connected to a control device that controls rotation of said outer ring.

11. An extruder arrangement according to claim 1, wherein said planetary pump is provided with planetary pinions and a planetary carrier, wherein said planetary pinions are mounted from an intake side of said planetary pump, and wherein said planetary carrier is provided with recesses through which viscous material can flow.

* * * * *